(12) United States Patent
Chamarthy et al.

(10) Patent No.: US 12,601,247 B1
(45) Date of Patent: Apr. 14, 2026

(54) DEBRIS COLLECTION DEVICE WITH PASSIVE CHECK VALVE

(71) Applicant: Halliburton Energy Services, Inc., Houston, TX (US)

(72) Inventors: Pramod Chamarthy, Carrollton, TX (US); Wei Zhang, Houston, TX (US); Rodney Marlow, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/002,537

(22) Filed: Dec. 26, 2024

(51) Int. Cl.
| | |
|---|---|
| *E21B 43/38* | (2006.01) |
| *E21B 34/06* | (2006.01) |
| *E21B 43/34* | (2006.01) |
| *F16K 15/00* | (2006.01) |

(52) U.S. Cl.
CPC .............. *E21B 43/38* (2013.01); *E21B 34/06* (2013.01); *E21B 43/35* (2020.05); *F16K 15/00* (2013.01)

(58) Field of Classification Search
CPC .................................. E21B 43/38; E21B 27/02
See application file for complete search history.

(56) References Cited

U.S. PATENT DOCUMENTS

| | | | | |
|---|---|---|---|---|
| 2,141,672 A | * | 12/1938 | Taylor ...................... | E21B 27/00 166/109 |
| 7,040,395 B2 | * | 5/2006 | Booth ...................... | E21B 37/02 166/173 |

| | | | |
|---|---|---|---|
| 8,056,622 B2 | 11/2011 | Lynde | |
| 8,109,331 B2 | 2/2012 | Lynde et al. | |
| 8,316,965 B2 | 11/2012 | Hallundbaek et al. | |
| 9,248,818 B2 | 2/2016 | Kane et al. | |
| 9,334,704 B2 * | 5/2016 | Mineo ................... | E21B 34/063 |
| 9,890,605 B2 | 2/2018 | Juhlin et al. | |
| 10,030,485 B2 | 7/2018 | Gourmelon | |
| 10,072,472 B2 | 9/2018 | Jensen | |
| 10,641,066 B2 * | 5/2020 | Mericas ................. | E21B 43/08 |
| 11,788,383 B2 * | 10/2023 | Schindler ............... | E21B 10/00 166/311 |
| 12,037,877 B1 * | 7/2024 | Fripp ...................... | E21B 37/00 |
| 2010/0089587 A1 * | 4/2010 | Stout ................... | E21B 23/0412 166/319 |
| 2010/0258297 A1 * | 10/2010 | Lynde ..................... | E21B 37/00 166/105.1 |

(Continued)

FOREIGN PATENT DOCUMENTS

| | | |
|---|---|---|
| CN | 116816310 A | 9/2023 |

OTHER PUBLICATIONS

International Search Report and Written Opinion for International Patent Application No. PCT/US2025/011377 dated Sep. 19, 2025. PDF file. 8 pages.

*Primary Examiner* — David Carroll

(74) *Attorney, Agent, or Firm* — John Wustenberg; C. Tumey Law Group PLLC

(57) ABSTRACT

A variety of methods and apparatus are disclosed, including, in one embodiment, a bailer to collect debris from a wellbore, the bailer including a passive check valve to provide preferential flow through an annular path over a central path of the bailer with the flow of debris-laden fluid and filtered fluid in an uphole direction through the bailer and provide preferential flow through the central path over the annular path with the flow of fluid in the downhole direction.

18 Claims, 6 Drawing Sheets

(56)        References Cited

U.S. PATENT DOCUMENTS

| | | | | |
|---|---|---|---|---|
| 2014/0014358 A1* | 1/2014 | Leitch | .................... | E21B 43/08 |
| | | | | 166/105.4 |
| 2014/0224471 A1* | 8/2014 | Coon | ................... | E21B 34/108 |
| | | | | 166/53 |
| 2015/0218901 A1* | 8/2015 | Juhlin | .................. | E21B 27/005 |
| | | | | 166/105.1 |
| 2017/0107798 A1* | 4/2017 | Gourmelon | .......... | E21B 43/121 |
| 2018/0106129 A1 | 4/2018 | Wise | | |
| 2018/0135388 A1* | 5/2018 | Mericas | ................. | E21B 43/08 |
| 2021/0172290 A1 | 6/2021 | Holcomb | | |
| 2024/0003237 A1* | 1/2024 | Xiao | ...................... | E21B 43/35 |
| 2024/0401994 A1 | 12/2024 | Godager et al. | | |

* cited by examiner

DEBRIS COLLECTION DEVICE WITH PASSIVE CHECK VALVE

BACKGROUND

Boreholes may be drilled into subterranean formations to recover valuable hydrocarbons, among other functions. Operations may be performed before, during, and after the borehole has been drilled to produce and continue the flow of the hydrocarbon fluids to the surface. Downhole tools in the borehole (wellbore) may facilitate the production of the hydrocarbon fluids from the subterranean formation. Downhole tools in the borehole (wellbore) may be utilized in reworking or maintaining the borehole.

During normal operation of an oil and gas well, the wellbore can become filled with various kinds of debris, such as sand, scale, grease, pipe dope, scrap metal, elastomers, and so forth. This can adversely impact production rates of the hydrocarbons. Sand grains in fluids can be abrasive to the tubing and valves. If the debris becomes accumulated in valves, operation of the valves can be adversely affected.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
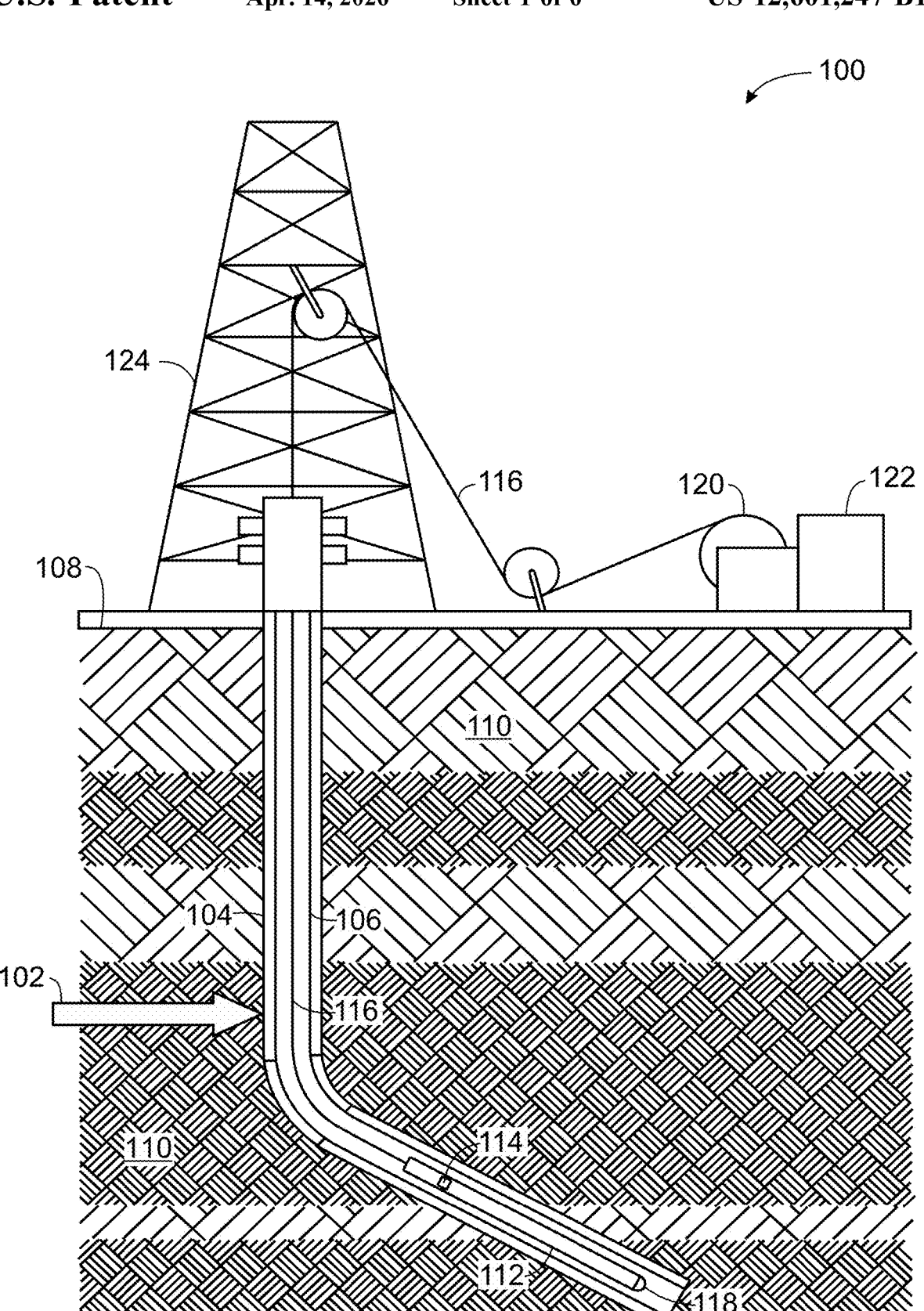
FIG. 1 is a diagram of a well site that includes a wellbore (borehole).

Disclosed herein are examples of a debris collection device for downhole in a wellbore or well, and methods of employing the downhole debris collection device. The debris collection device has a passive check valve. The debris collection device may be labeled, for instance, as a bailer (e.g., suction bailer, pump bailer, vacuum bailer, etc.) and the like. In implementations, the debris collection device is a wireline tool and thus may be deployed into the wellbore (borehole) via a wireline. Electricity may be provided via the wireline, such as to power a pump of the bailer. The pump may provide for uphole flow of fluid during normal operation, and the pump flow reversed during cleaning of the bailer in the wellbore with the pump providing flow of fluid in the downhole direction.

There are tools run on coiled tubing that can be deployed downhole into a wellbore to collect (suck up) debris and thus clean the well. These downhole tools (for debris removal) run on coiled tubing can remove relatively large quantities of debris but are expensive and generally require several personnel to operate them. Slickline run tools are cheaper to run, but typically remove small amounts of debris at a time. In implementations, wireline-run debris removal tools can be characterized as filling this gap in between coiled-tubing run tools and slickline run tools. Wireline-run debris removal tools can generally remove moderate amounts of debris while costing significantly less compared to a coiled tubing service.

These wireline-deployed tools (e.g., bailer) can become buried or stuck in the debris including, for example, if run too fast. In such cases, the flow direction is reversed so that the fluid jets out and helps to dislodge the tool or clear any blockage inside the tool. Check valves may be placed in the tool flow path so that the debris that has been already collected (e.g., inside a chamber of the tool) does not wash out. The check valve may have a ball or piston as a moving part, which can become stuck in the open or closed position due to debris. This could cause the tool to fail.

Embodiments herein utilize a passive check valve that does not have moving parts. Therefore, because there are no moving parts, the risk of failure may be reduced. The check valve can consist of a tortuous flow path designed in such a way that the pressure drop is significantly higher when fluid flows in one direction than the other direction, such as with a Tesla valve or a labyrinth valve. The check valve can consist of plates, petals, or obstructions in the flow path angled in such a way that the pressure drop is less in one axial direction but significantly higher in the opposite axial direction. Implementations provide downhole tools for debris removal that employ passive check valves with no moving parts. By avoiding moving parts, the tool may be more reliable. In implementations, the downhole tool may be a bailer, such as a suction bailer tool.

In embodiments, the flow path can be as a Tesla valve such that the pressure drop is lower in the desired direction, but the pressure drop is higher in the opposite direction. Whether a Tesla valve or other fixed geometry, the tortuous flow path can be three dimensional (3D) printed, machined, cast, and so forth. Petals or vanes can be machined and attached in the main flow path and angled in such a way that the pressure drop is lower in the desired direction but the pressure drop is higher in the opposite direction. The individual vanes, plates, or petals can be machined, 3D printed, cast, welded, or screwed, and the like. These components may be welded or screwed onto parts (e.g., housing, body, tube, etc.) of the bailer. In implementations, there can be two axial flow paths in the bailer and two of these check valves combined or otherwise placed in each path, respectively, in opposing directions to act as a double sided check valve.

FIG. 1 is a well site 100 that includes a wellbore 102 (borehole). In the illustrated implementation, the wellbore 102 includes casing 104 (wellbore casing) and production tubing 106 installed in the wellbore 102. The production tubing 106 (if present) may be a tubing string utilized in the production of hydrocarbons. The wellbore 102 is formed through the Earth surface 108 into the subterranean formation 110 in the Earth crust.

A downhole tool that is a bailer 112 (e.g., suction bailer) is deployed in the wellbore 102. The bailer 112 may be deployed into the wellbore 102, for example, with surface equipment. In particular, the bailer 112 may be lowered into the wellbore 102 from the surface 108 via the surface equipment. The bailer 112 is a debris collection (removal) device. In implementations, the bailer 112 may be deployed or situated in the production tubing 106. The bailer 112 has a passive check valve 114. In operation, the bailer 112 pulls a debris-laden fluid (that is wellbore fluid and debris) from the wellbore 102 (via bailer pump suction force) into the bailer 112 at the downhole end 118 of the bailer 112. The bailer 112 collects the debris in a chamber of the bailer 112. In this debris-collecting mode of bailer 112 operation, the bailer pump provides for flow of fluid in the uphole direction through the bailer 112. The pump of the bailer 112 discharges fluid back into the wellbore.

Conversely, for cleaning the bailer 112 or dislodging the bailer 112 undesirably stuck in debris in the wellbore 102, the bailer 112 pump may reverse fluid flow. In this cleaning or dislodging operation, the bailer 112 pump may reverse fluid flow in the downhole direction. In this operational mode, the bailer 112 may receive fluid (e.g., wellbore fluid, such as generally a water-based fluid or aqueous fluid) from the wellbore 102 at the uphole end of the bailer 112 and discharge the fluid at the downhole end of the bailer 112 into the wellbore 102. In implementations, the check valve 114 in this reverse flow mode may favor fluid flow through a bailer 112 center path (e.g., center tube) in the downhole direction for cleaning, but disfavor fluid flow through the center path in the uphole direction in the debris-collecting operation.

In the illustrated implementation, the wellbore 102 has the casing 104 and is therefore a cased wellbore. Cement (not shown) may be disposed between the casing 104 and the formation 110 face. The formation 110 face can be considered a wall of the wellbore 102. The casing 104 may be secured within wellbore 102 by the cement. The casing 104 may be, for example, metal, plastic, composites, and the like, and may be expanded or unexpanded as part of an installation procedure.

Perforations may be formed through the casing 104 (and cement) for entry of fluid (e.g., hydrocarbon, water, etc.) from the subterranean formation 110 into the wellbore 102 to be produced (routed) as produced fluid through the production tubing 106 to the surface 108. A perforating gun may be sent down the wellbore 102 to blast holes (perforations) in the casing 104. The surface equipment may include a wellhead for receipt of the produced fluid. In other implementations, the wellbore can be utilized for injection of fluid from the surface 108 through the wellbore 102 and the perforations in the casing 104 (and cement) into the subterranean formation 110. The surface equipment can include equipment (e.g., pumps, vessels, vehicles, etc.) for hydraulic fracturing of the subterranean formation 110 via the wellbore 102.

The surface equipment can include a hoisting apparatus (e.g., for raising and lowering pipe strings) and a derrick 124. The surface equipment and equipment deployed in the wellbore 102 can include a wireline 116, slickline, coiled tubing, tubing string, pipe, drill pipe, drill string, and the like, that facilitates mechanical conveyance for deploying downhole tools (e.g., the bailer 112 and other tools). As mentioned, the deployment of the bailer 112 may include lowering the bailer 112 into the wellbore 102 from the surface 108 and moving the bailer 112 in the wellbore 102 in operation. In some implementations, the surface equipment may provide electrical connectivity, for example, via a wireline 116 to provide electricity to the pump of the bailer 112. In the illustrated embodiment, the bailer 112 is conveyed by a wireline 116 into the wellbore 102 in the formation 110. The wireline 116 is operatively connected to a winch 120 and a control unit 122. A derrick 124 supports the wireline 102. In this example, the bailer 112 may be characterized or labeled as a wireline device (wireline tool).

It should be understood by those skilled in the art that present examples are equally well suited for use in wellbores having other directional configurations including vertical wellbore, horizontal wellbores, deviated wellbores, multilateral wells and the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well. Also, even though FIG. 1 depicts an onshore operation, it should be understood by those skilled in the art that the present techniques are applicable for offshore operations. In addition, while FIG. 1 depicts use of the bailer 112 in a cased portion of wellbore 102, it should be understood that a bailer 112 may also be used in uncased portions (e.g., openhole portions) of wellbore 102.

Figures 2A, 2B:
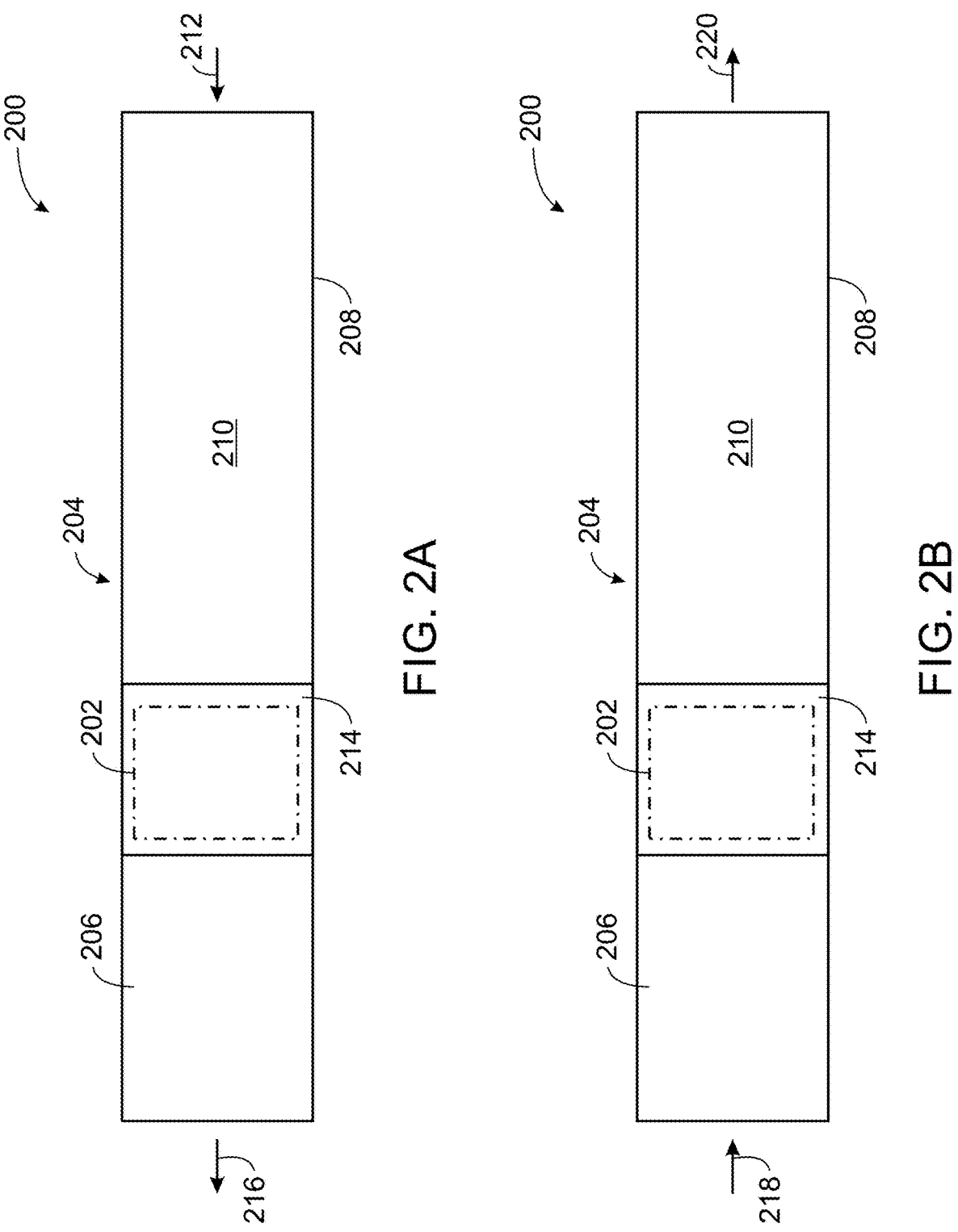
FIG. 2A is a diagram of a representation of a bailer.
FIG. 2B is a diagram of a representation of the bailer of FIG. 2A but depicted with the flow of fluid in the downhole direction through the bailer.

FIG. 2A is a representation of an example of a bailer 200 (e.g., analogous to the bailer 112 of FIG. 1). To the left of the bailer 200 is the uphole direction. To the right of the bailer 200 in FIG. 2 is the downhole direction. The bailer 200 is depicted operating in the debris-collecting mode (suction mode) with the flow of fluid through the bailer 200 in the uphole direction.

The bailer 200 includes a passive check valve 202 in a flow section 204 of the bailer 200. The passive check valve 202 is configured to favor flow of fluid in an annular path of the bailer 200 when the flow of fluid through the bailer 200 is in the uphole direction, as depicted. Conversely, the passive check valve 202 is configured to favor flow of fluid in a center path of the bailer 200, such as in a center tube, when the flow of fluid through the bailer 200 is in the downhole direction (see, e.g., FIG. 2B).

The bailer 200 includes a pump 206 (e.g., having a motor) and a housing 208. The bailer 200 can include power electronics, gear boxes, flexible joints, and so forth. The pump 206 can be, for example, a centrifugal pump or a positive displacement pump. In examples, the pump is a positive displacement pump that is a progressive cavity pump.

The flow section 204 includes a collection assembly 210 that removes (e.g., filters) and collects debris from the inlet fluid 212 (e.g., debris-laden wellbore fluid) that enters the bailer 200. The collection assembly 210 can include one or more chambers to remove (e.g., filter), collect, and hold the debris. The collection assembly 210 can be labeled as a collection chamber assembly. The collection assembly 210 can include one or more chambers or compartments to collect solids (e.g., debris) from the wellbore or wellbore fluid.

The flow section 204 includes a transition portion 214 between the collection assembly 210 and the pump 206. In examples, the transition portion 214 can be configured to provide or route the fluid (e.g., filtered fluid) from the collection assembly 210 to the pump 206 suction with the bailer 200 operating in the suction mode, as shown. In the illustrated implementation, the passive check valve 202 is situated in the transition portion 214. In other implementations, the passive check valve 202 (or a portion of the passive check valve 202) can be disposed in the collection assembly 210. In other implementations, the passive check valve 202 (or some of the passive check valve 202) can be disposed at the pump 206 suction outside of the transition portion 214.

In the debris-collecting operation that can be labeled as suction mode, the inlet fluid 212 (e.g., wellbore fluid) from the wellbore enters the flow section 204 at the downhole end of the bailer 200. The suction mode operation can be collecting solids including debris from the wellbore for removal of the solids from the wellbore. The debris-collecting mode of operation of the bailer 200 can be labeled as the suction mode of operation of the bailer because the motive force for flow of the inlet fluid (e.g., debris-laden fluid) into the bailer 200 can be provided by the pump 206 suction. The inlet fluid 212 can have solids including debris. The inlet fluid 212 can be a debris-laden fluid that is fluid having or carrying debris.

The pump 206, via pump suction force, may pull the inlet fluid 210 into the bailer 200. In implementations, formation pressure or wellbore pressure may advance flow of the inlet fluid into the bailer 200. The pump 206, via pump suction force, may provide motive force for flow of fluid into and through the flow section 204 in the uphole direction in the debris-collecting mode of operation. In this debris-collecting mode of operation, the pumped fluid via the pump 206 is in the uphole direction. In this operation, the bailer 200 collects the solids (e.g., including debris) in one or more chambers or compartments of the collection assembly 210 in the flow section 204. The pump 206 discharges an outlet fluid 216 at the uphole end of the bailer 200 into the wellbore. The outlet fluid 216 can be the inlet fluid 212 minus the solids collected in the bailer 200. The bailer 200 can be raised to the surface from the wellbore for removal (emptying) of the collected solids from the bailer 200, such as from the one or more chambers (that collects solids from the inlet fluid 210) in the collection assembly 210 of the flow section 204.

The bailer 200 while in the wellbore can be operated in reverse flow mode (cleaning and/or dislodging mode) of the bailer 200 to clean the bailer 200 and/or to dislodge the bailer 200 stuck in debris in the wellbore. In such an operation or operating mode, the pump 206 reverses flow of pumped fluid to downhole direction for the cleaning or dislodging mode. In implementations, to reverse the flow (reverse the flow direction), the rotation or revolution of the pump (e.g., of the motor and/or rotor) may be reversed or otherwise altered.

FIG. 2B is the bailer 200 (e.g., suction bailer) of FIG. 2A but depicted operating in the reverse flow mode with the flow of fluid in the downhole direction (to the right) through the bailer 200. As discussed, the downhole direction of flow can be for cleaning the bailer 200 or dislodging the bailer 200 stuck (e.g., in debris or sand) in a wellbore. In this operation in a wellbore, the bailer 200 receives fluid 218 (e.g., wellbore fluid) as inlet fluid to the uphole end of the bailer 200. The pump 206 pumps (provides motive force for flow of) the fluid 218 through the flow section 204 in a downhole direction for discharge as an ejected fluid 220 at a downhole end of the bailer 200. The flow of the fluid 218 in the bailer 200 may clean and/or unplug internal portions (e.g., in flow section 204) of the bailer 200. The discharge of the fluid 218 as an ejected fluid 220 into the wellbore may facilitate dislodging of the bailer 200 if stuck in debris (or sand, etc.) in the wellbore.

Figures 3A, 3B:
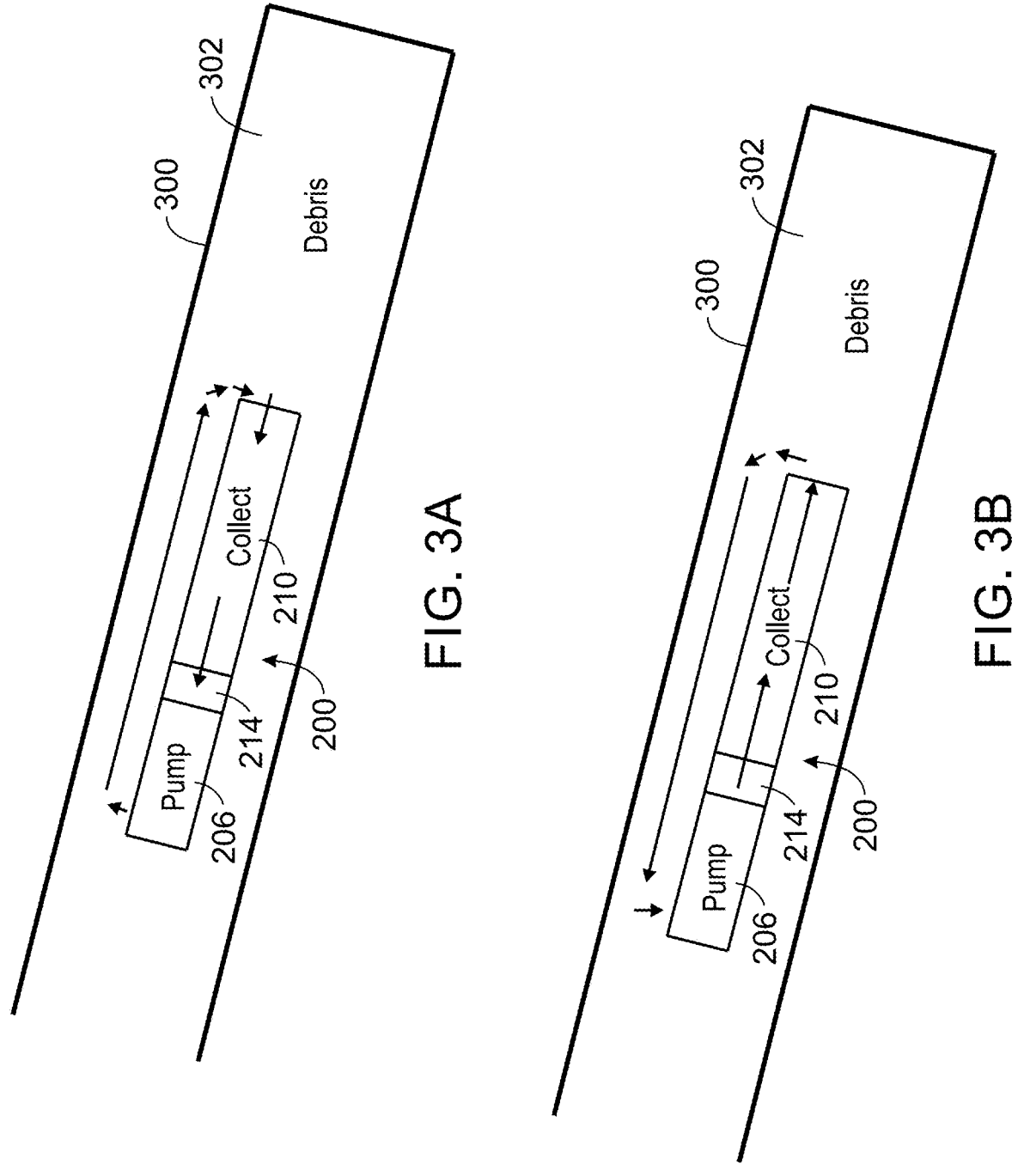
FIG. 3A is a diagram of a bailer operating in a debris-collecting mode (suction mode) in a wellbore 300, and with fluid flow through the bailer in the uphole direction.
FIG. 3B is a diagram of a bailer operating in a reverse flow mode (e.g., for cleaning or dislodging the bailer) in a wellbore, and with fluid flow through the bailer in the downhole direction.

FIG. 3A depicts the bailer 200 operating in a debris-collecting mode (suction mode) in a wellbore 300. To the left of the bailer 200 is the uphole direction. To the right of the bailer 200 is the downhole direction. In the illustrated example, debris 302 is in a lower (bottom) portion of the wellbore 300. As discussed with respect to FIG. 2A, the bailer 200 includes a collection assembly 210, a transition portion 214, and a pump 206. The collection assembly 210 is a collection chamber assembly having one or more chambers to collect and hold debris. In operation for the debris-collecting mode (suction mode), the flow of fluid through the bailer 200 is in the uphole direction, as indicated by the flow arrows. The pump 206 discharges the fluid at the uphole end portion of the bailer 200 into the wellbore 300. The fluid as discharged can recycle or migrate in the wellbore 300 to the inlet of the bailer 200 at the downhole end portion of the bailer 200, as depicted by the flow arrows. Thus, the bailer 200 in this operating mode can be characterized as discharging fluid at the uphole end of the bailer 200 into the wellbore and in which the discharged fluid can travel back to the downhole portion (lower portion, bottom portion) of the tool (bailer 200) to pick up more debris.

FIG. 3B depicts the bailer 200 operating in the reverse flow mode (e.g., for cleaning or dislodging the bailer 200) in the wellbore 300. Thus, in operation, the flow of fluid through the bailer 200 is in the downhole direction, as indicated by the flow arrows. The pump 206 receives fluid from the wellbore 300 and discharges the fluid in the downhole direction through the bailer 200. As this is not a debris-collecting mode, the collection assembly 210 may generally not collect significant debris from the flowing fluid (if any debris is present in the flowing fluid). The fluid as flowing downhole through the bailer 200 can facilitate cleaning the bailer 200 internals. The fluid as discharged from the bailer 200 at the downhole end can facilitate dislodging the bailer 200 from debris in the wellbore 300 if the bailer 200 is stuck in the debris. The fluid as discharged from the bailer 200 at the downhole end can recycle or migrate in the wellbore 300 to the pump 206 suction, as depicted by the flow arrows.

Figures 4, 5, 6, 7:
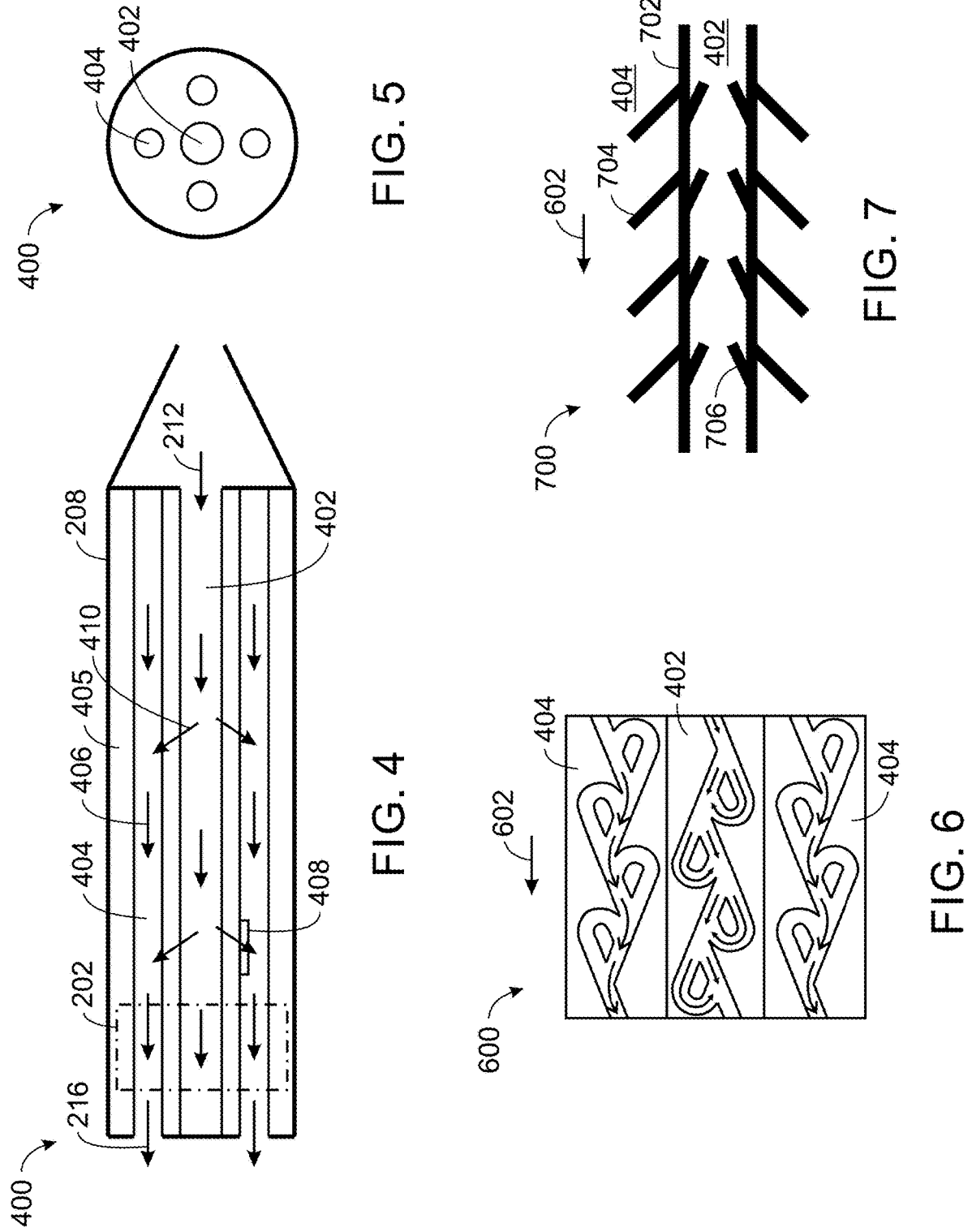
FIG. 4 is a diagram of a flow section of a bailer.
FIG. 5 is an end view of the bailer flow section of FIG. 4.
FIG. 6 is a diagram of a passive check valve.
FIG. 7 is a diagram of a passive check valve.

FIG. 4 is an example of a flow section 400 of a bailer that may be analogous to the flow section 204 of FIG. 2. To the left, is uphole. To the right, is downhole. For flow of fluid in the uphole direction in the suction operating mode of the bailer, the flow section 400 includes a central path 402 that receives inlet fluid 212 (e.g., debris-laden wellbore fluid) from the wellbore, and an annular path 404 for flow of filter fluid 406 in the uphole direction.

The flow section 400 includes a passive check valve 202 that favors flow of fluid in the annular path 404 of the flow section 400 when the flow of fluid through the flow section 400 is in the uphole direction as depicted with the flow arrows. For the flow of fluid in the uphole direction in the bailer, the passive check valve 202 may provide preferential flow of the fluid through the annular path 404 over the central path 402. In other words, for the flow of fluid in the uphole direction, the passive check valve 202 may provide for the annular pressure drop through the annular path 404 to be less than the central pressure drop through the central path 402. Conversely, the passive check valve 202 favors flow of fluid in the central path 402 of the flow section 400, such as in a central tube, when the flow of fluid through the bailer 200 is in the downhole direction, which is reverse of the depicted flow arrows.

As indicated, the flow section 400 includes the central path 402 (central flow path) and the annular path 404 (annular flow path), both generally running axially. The central path 402 may run axially on the center axis of the bailer flow section 400 and/or the bailer. The central path 402 can be or include a central tube for at least for a portion of the axial length of the central path 402. The annular path 404 is in the annular region 405 between the central path 402 and the housing 208. In implementations, the annular path 404 can be a tube (labeled as an annular tube or side tube) for at least for a portion of the axial length of the annular path 404. Axial lengths (portions) of the flow section 400 may be characterized or labeled as chambers or compartments that collect solids. A chamber can include the central path 402 and the annular region (including the annular path 404) between the central path 402 and the housing 208.

In operation (a debris-collecting mode of operation), a bailer pump (e.g., 206 of FIG. 2) pulls inlet fluid 212 (wellbore fluid) having debris (solids) from downhole in the wellbore (borehole) into the central path 402 of the bailer flow section 400. The inlet fluid 212 may be labeled as debris-laden fluid. The debris-laden inlet fluid 212 is conveyed in the central path by at least the suction motive force of the bailer pump. The inlet fluid 212 (having solids) can be filtered in the bailer flow section 400 to remove solids. The resulting inlet fluid 212 minus the removed solids flows as filtered fluid 406 (e.g., relatively clean fluid) in the annular path 404, which discharges as outlet fluid 216. In implementations, the filtered fluid 406 can be labeled as a clean fluid in the sense of being substantially free of significant solids. The removed solids can be collected, for example, in filters in the central path 402 and/or in the annular region 405 around the annular path 404.

In implementations, a chamber of the flow section 400 may have a filter in the central path 402 that removes solids. If so, the inlet fluid 212 minus the removed solids may flow through the central path 402 to the next chamber and ultimately flow through a route 410 into the annular flow path 404 as filtered fluid 406.

For implementations with a chamber of the flow section 400 having the annular path 404 as a tube, the filter (e.g., filter 408) may be situated at the annular tube wall. If so, the inlet fluid 212 (having solids) as flowing through the central path 402 exits radially through routes 410 or paths (e.g., generally in the radial direction) and enters the annular tube through the filter 408 (e.g., screen) that removes solids. The removed solids as filtered may collect, for example, in annular region 405 around the annular tube. For the central path 402 (or portions of the central path 402) as a tube (central tube), the route 410 may include a hole or opening in the central tube wall.

FIG. 5 is an end view of the bailer flow section 400 of FIG. 4. Depicted is the central path 402, which can be a central tube. Depicted is the annular path(s) 404, which can be an annular tube(s).

FIG. 6 is an example of a representation of a passive check valve 600 that can be the passive check valve 202 of FIG. 2A, FIG. 2B, and FIG. 4. The passive check valve 600 (fixed geometry with no moving parts) is a Tesla valve in the annular path 404 (see also FIG. 4) and another Tesla valve as reversed in the central path 402 (see also FIG. 4). The check valve 600 can be characterized as a single check valve, as two check valves or multiple check valves, or as an overall check valve with multiple check valves as components, and the like. In FIG. 6, the flow direction 602 of fluid through the check valve 600 is in the uphole direction. For the flow of fluid in the uphole direction, as depicted, the passive check valve 600 provides (facilitates) the flow of fluid preferentially through the annular path 404 over the central path 402. The passive check valve 600 gives a greater pressure drop through the central path 402 than through the annular path 404 for the flow of the fluid (e.g., wellbore fluid) from the wellbore through the bailer in the uphole direction. Thus, the passive check valve 600 is configured to provide for the annular pressure drop through the annular path 404 less than the central pressure drop through the central path 402 with or in response to the flow of the debris-laden fluid in the uphole direction and the flow of the filtered fluid in the uphole direction. In contrast, the passive check valve 600 is configured to provide for an annular pressure drop through the annular path 404 greater than a central pressure drop through the central path 402 with or in response to the flow of the fluid in the bailer in the downhole direction.

FIG. 7 is an example of a representation of a passive check valve 700 that can be the passive check valve 212 of FIG. 2A, FIG. 2B, and FIG. 4. The passive check valve 700 (fixed geometry with no moving parts) is a labyrinth valve. The passive check valve 700 as a labyrinth valve includes a tube 702 (conduit) with first plates 704 (petals) on an outside surface (outside diameter) of the tube 702 and angled in a first direction into the annular path 404. The passive check valve 700 as a labyrinth valve includes second plates 706 (petals) angled in a second direction into the central path 402 and coupled to an inside surface (e.g., inside wall or inside diameter) of the tube 702. The second direction is different than the first direction. In implementations, the tube 702 can be a central tube of the bailer, such as the central path 402 as a central tube in FIG. 4.

In FIG. 7, the flow of fluid through the check valve is in the uphole direction. For the flow of fluid in the uphole direction, the passive check valve 700 provides (facilitates) the flow of fluid preferentially through the annular path 404 over the central path 402. The passive check valve 700 gives a greater pressure drop through the central path 402 than through the annular path 404 for the flow of the fluid (e.g., wellbore fluid) from the wellbore through the bailer in the uphole direction.

As mentioned for FIG. 4, the flow of fluid through the flow section 400 may be instead in the downhole direction, which is reverse of the flow arrows depicted. See, for example, FIG. 2B that depicts fluid 218 entering the uphole end of the bailer 200. Such may occur, for example, in reverse flow operation in which fluid is received from the wellbore at the uphole end to dislodge plugging material in the bailer flow section 400 and/or dislodge the bailer stuck in debris in the wellbore. The operation of the bailer pump may reverse the flow of fluid through the pump. For the flow of the fluid in the downhole direction in the flow section 400, the passive check valve 202 may provide preferential flow of the fluid through the central path 402 over the annular path 404. This may advance, for example, dislodging debris from a chamber plugged with solids (debris) in the flow section 400 (e.g., as with a plugged central path 402 or plugged annular region 405), and/or provide force for dislodging the bailer from a stuck position in debris in the wellbore.

Figures 8, 9, 10:
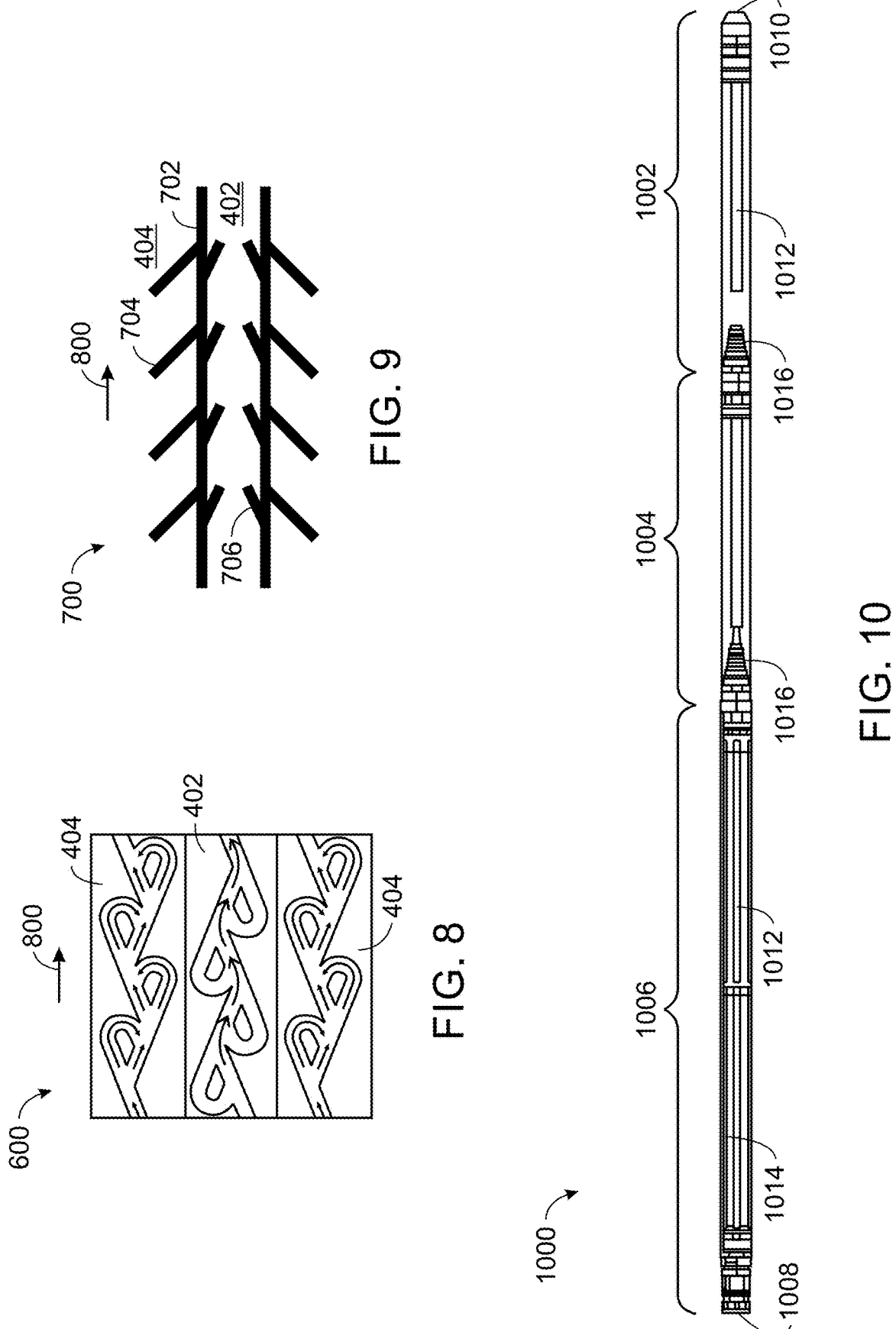
FIG. 8 is a diagram of the passive check valve of FIG. 6 but with the fluid flow direction depicted in the downhole direction.
FIG. 9 is a diagram of the passive check valve of FIG. 7 but with the fluid flow direction depicted in the downhole direction.
FIG. 10 is a diagram of a collection chamber assembly of a bailer.

FIG. 8 is the passive check valve 600 of FIG. 6 but with the fluid flow direction 800 (fluid entering at the uphole end of the bailer) through the bailer is depicted in the downhole direction. For the flow of fluid in the downhole direction, the passive check valve 600 provides (facilitates) the flow of fluid preferentially through the central path 402 over the annular path 404. The passive check valve 600 gives a greater pressure drop through the annular path 404 than through the central path 402 for the flow of the fluid from the surface in the downhole direction.

FIG. 9 is the passive check valve 700 of FIG. 7 but with the fluid flow direction 800 (fluid entering at uphole end of bailer) through the bailer flow section 400 in the downhole direction. For the flow of fluid in the downhole direction, the passive check valve 700 provides (facilitates) the flow of fluid preferentially through the central path 402 over the annular path 404. The passive check valve 600 gives a greater pressure drop through the annular path 404 than through the central path 402 for the flow of fluid through the bailer in the downhole direction.

FIG. 10 is an example of collection assembly 1000 (collection chamber assembly) of a bailer and that can be analogous to the collection assembly 210 of FIGS. 2A and 2B and in the flow section 400 of FIG. 4. In implementations, a passive check valve as discussed, may be situated in the bailer outside of the collection assembly 1000 to the left (uphole end) in the bailer.

The collection assembly 1000 includes three chambers: a first chamber 1002, a second chamber 1004, and a third chamber 1006. In an implementation, the first chamber 1002 is a large particle chamber (e.g., for particle size ranging from 0.25 inch [in] to 0.75 in), the second chamber 1004 is a medium particle chamber (e.g., for particle size in the range of 0.05 in to 0.25 in), and the third chamber 1006 is a fine particle chamber (e.g., for particle in the range of 0.002 in to 0.05 in). In implementations, one or more of the chambers 1002, 1004, 1006 can have a passive check valve of the preceding figures, as discussed.

The bailer flow section 1000 has an uphole end 1008 and a downhole end 1010. The uphole end 1008 interfaces with or couples to the bailer pump, e.g., via a transition portion of the bailer. The downhole end 1010 is the inlet end for the bailer in debris-collecting mode of operation (suction mode) of collecting debris in a wellbore. The three chambers 1002, 1004, 1006 each include a central tube 1012. The third chamber 1006 includes an annular tube 1014. The first chamber 1002 and the second chamber 1004 each include a filter 1016 for filtering solids from the inlet fluid. The third chamber includes one or more filters (e.g., screen or mesh) at a wall opening, respectively, of the annular tube 1014.

In operation in the wellbore, the inlet fluid (e.g., debris-laden wellbore fluid) enters the downhole end 1010 of the flow section 1000 and flows in the central tube 1012. The filters 1016 remove (collect) solids from the inlet fluid.

In the third chamber 1006, the inlet fluid still having some solids exits through holes in the central tube 1014 wall and enters through filters (e.g., screens) at openings on the annular tube 1014 wall. The wall filters remove solids from the inlet fluid. The solids may collect in the annular region in outside of the central tube 1012 and around the annular tube 1014. The filtered fluid can discharge from the annular tube 1014 at the uphole end 1008 to the bailer pump suction.

Figures 11, 12, 13:
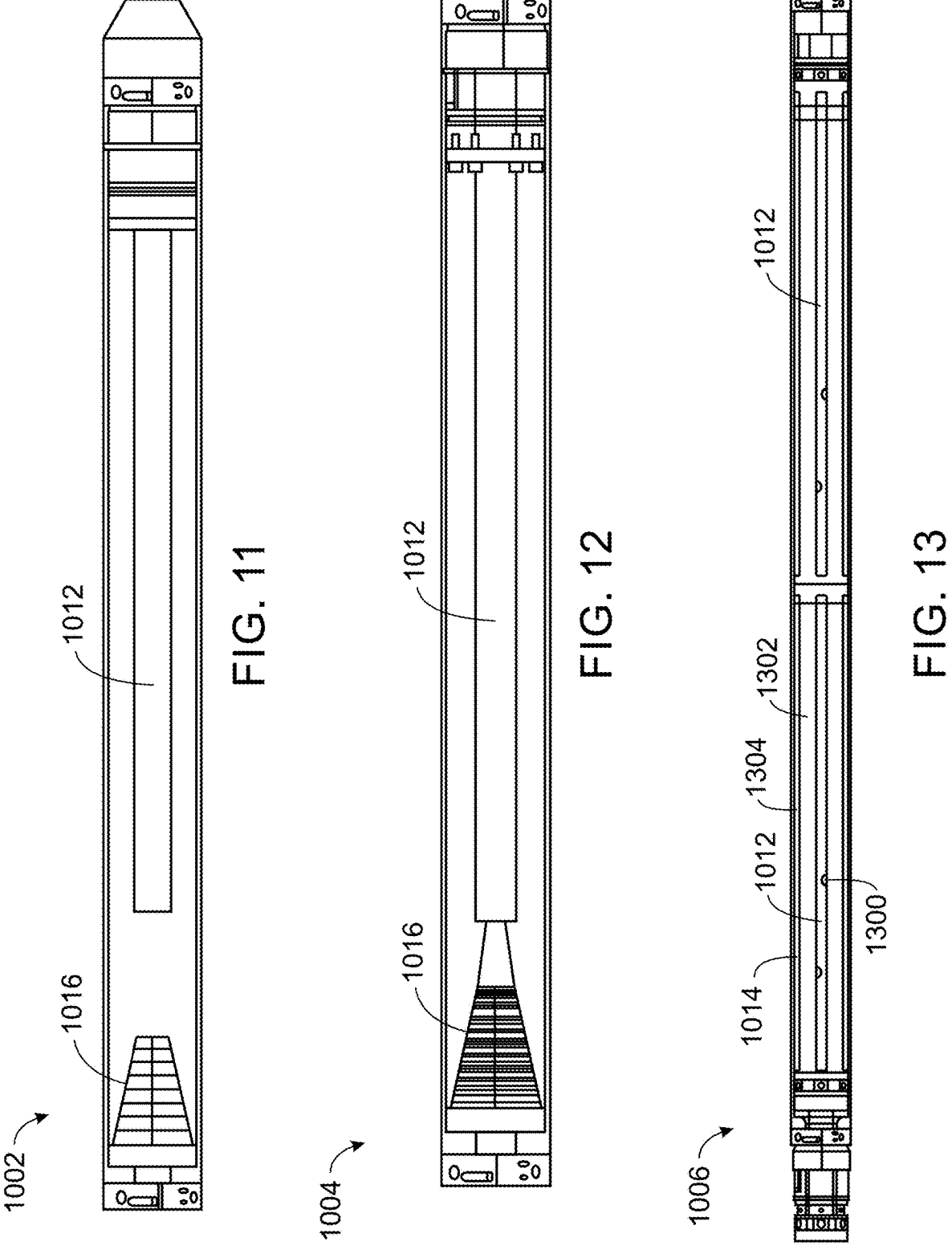
FIG. 11 is a diagram of the first chamber of the collection chamber assembly of FIG. 10.
FIG. 12 is a diagram of the second chamber of the collection chamber assembly of FIG. 10.
FIG. 13 is a diagram of the third chamber of the collection chamber assembly of FIG. 10.

FIG. 11 is first chamber 1002 of the bailer collection assembly 1000 of FIG. 10. Depicted are a central tube 1012 and a filter 1016.

FIG. 12 is the second chamber 1004 of the bailer collection assembly 1000 of FIG. 10. Depicted are a central tube 1012 and a filter 1016.

FIG. 13 is the third chamber 1006 of the bailer collection assembly 1000 of FIG. 10. The third chamber 1006 includes the central tube 1012 for flow of fluid having solids and an annular tube 1014 for flow of filtered fluid. The central tube

1012 in the third chamber 1006 has openings 1300 for discharge of fluid having solids into the annular region 1302 between the central tube 1012 and the housing of the chamber 1006 (e.g., and of the bailer generally). The annular tube 1014 has a wall opening covered by a filter 1304 (wall filter) such as a screen. In operation, the fluid having solids that discharges from the central tube 1012 through a tube wall opening 1300 of the central tube 1012 into the annular region can flow through the filter 1304 into the annular tube 1014 as filtered fluid. The filter 1304 can remove solids (from the fluid) that can collect in the annular region 1302 outside of the annular tube 1014.

The bailer collection chamber assembly includes a central path (e.g., central tube) for flow of fluid, an annular flow path (for flow of filtered fluid), and a housing. The central path (e.g., central tube) is at a radial center of the bailer collection chamber assembly and runs in an axial direction. The annular path is formed radially between the central path and the housing.

The bailer has a passive check valve, as discussed. For fluid flow in the uphole direction, the passive check valve may provide preferential flow of the fluid through the annular path over the central path. In other words, for the flow of fluid in the uphole direction, the passive check valve may provide for the pressure drop (annular pressure drop) through the annular path to be less than the central pressure drop through the central path.

For flow of fluid in the downhole direction through the bailer, the operation of the pump of the bailer may reverse the flow of fluid through the pump. Such may occur, for example, in a reverse mode operation in which fluid enters the uphole end portion of the bailer to dislodge plugging material in the bailer or dislodge the bailer stuck in debris or sand in the wellbore. For the flow of the fluid in the downhole direction through the bailer flow section, the bailer passive check valve may provide preferential flow of the fluid through the central path over the annular path. This may advance, for example, dislodging solids (e.g., debris, sand, etc.) in a center path that is plugged, and/or provide force for dislodging the bailer from a stuck position in debris in the wellbore.

In view of the foregoing, the present disclosure may provide bailer (e.g., suction bailer) for use in a wellbore to collect debris from the wellbore, the bailer including a passive check valve. The methods, systems, and tools may include any of the various features disclosed herein, including one or more of the following statements.

Statement 1. A bailer for use in a wellbore to collect debris from the wellbore, the bailer comprising: a housing; a central path to receive debris-laden fluid from the wellbore with flow of the debris-laden fluid in an uphole direction and to receive fluid from the wellbore with flow of the fluid through the bailer in a downhole direction; an annular path radially between the central path and the housing for flow of filtered fluid in the uphole direction and for the flow of the fluid in the downhole direction; a pump to provide motive force through the central path and the annular path in both the uphole direction and the downhole direction; a chamber to hold debris filtered from the debris-laden fluid; and a passive check valve to provide a first preferential flow through the annular path over the central path with the flow of the debris-laden fluid and the filtered fluid in the uphole direction and provide a second preferential flow through the central path over the annular path with the flow of the fluid in the downhole direction.

Statement 2. The bailer of Statement 1, wherein the pump is configured to provide the filtered fluid in the uphole direction during collection of the debris by the bailer from the wellbore, and wherein the pump is configured to provide the fluid comprising an aqueous fluid from the wellbore in the downhole direction during cleaning or dislodging of the bailer in the wellbore.

Statement 3. The bailer of any preceding Statement, wherein the passive check valve comprises a fixed-geometry check valve.

Statement 4. The bailer of any preceding Statement, wherein the passive check valve has no moving parts.

Statement 5. The bailer of any preceding Statement, wherein the passive check valve comprises a Tesla valve.

Statement 6. The bailer of any preceding Statement, wherein the passive check valve comprises a labyrinth valve.

Statement 7. The bailer of any preceding Statement, wherein the passive check valve is configured to provide for an annular pressure drop through the annular path greater than a central pressure drop through the central path in response to the flow of the fluid in the downhole direction.

Statement 8. The bailer of any preceding Statement, wherein the passive check valve is configured to provide for the annular pressure drop through the annular path less than the central pressure drop through the central path in response to the flow of the debris-laden fluid in the uphole direction and the flow of the filtered fluid in the uphole direction.

Statement 9. The bailer of any preceding Statement, comprising a filter to separate the debris from the debris-laden fluid.

Statement 10. The bailer of any preceding Statement, wherein the central path is at a radial center of the bailer and runs in an axial direction.

Statement 11. The bailer of any preceding Statement, wherein a central tube of the bailer comprises the central path.

Statement 12. The bailer of Statement 11, wherein the central tube is at a radial center of the bailer and runs in an axial direction.

Statement 13. A method of collecting debris from a wellbore, comprising: deploying a bailer into the wellbore, the bailer comprising a passive check valve having a fixed geometry with no moving parts; flowing debris-laden fluid from the wellbore in an uphole direction into a central path of the bailer via a pump of the bailer as operating in a debris-collecting mode of the bailer; filtering debris from the debris-laden fluid in the debris-collecting mode giving a filtered fluid in the uphole direction in an annular path of the bailer, wherein the passive check valve provides for preferential fluid flow through the annular path over the central path in the debris-collecting mode; holding the debris in a chamber of the bailer; raising the bailer to surface from the wellbore; and emptying the chamber of the debris at the surface.

Statement 14. The method of Statement 13, wherein the debris-collecting mode comprises a suction mode of the bailer.

Statement 15. The method of Statement 13 or Statement 14, wherein the passive check valve comprises a Tesla valve.

Statement 16. The method of Statements 13-15, wherein the passive check valve comprises a labyrinth valve.

Statement 17. The method of Statements 13-16, comprising, in a reverse flow mode of the bailer, flowing fluid from the wellbore in a downhole direction through the bailer to clean the bailer or dislodge the bailer as stuck in the wellbore, or a combination thereof.

Statement 18. The method of Statements 13-17, wherein the passive check valve provides for the preferential fluid flow through the central path over the annular path in the reverse flow mode.

Statement 19. The method of Statements 13-18, wherein the passive check valve favors flow of the fluid through the central path over the annular path in reverse flow mode.

Statement 20. The method of Statements 13-19, wherein the passive check valve gives a greater pressure drop through the annular path than through the central path for flow of the fluid in the downhole direction in the reverse flow mode, wherein the fluid comprises wellbore fluid.

Statement 21. The method of Statements 13-20, wherein the deploying the bailer comprises lowering the bailer from the surface into the wellbore.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A bailer for use in a wellbore to collect debris from the wellbore, the bailer comprising:
   a housing;
   a central path to receive debris-laden fluid from the wellbore with flow of the debris-laden fluid in an uphole direction and to receive wellbore fluid from the wellbore with flow of the wellbore fluid through the bailer in a downhole direction;
   a filter to separate the debris from the debris-laden fluid to give filtered fluid;
   an annular path radially between the central path and the housing for flow of the filtered fluid in the uphole direction and for the flow of the wellbore fluid in the downhole direction;

a pump to provide motive force through the central path and the annular path in both the uphole direction and the downhole direction;

a chamber to hold the debris filtered from the debris-laden fluid; and a passive check valve to provide a first preferential flow through the annular path over the central path with the flow of the debris-laden fluid and the filtered fluid in the uphole direction and provide a second preferential flow through the central path over the annular path with the flow of the wellbore fluid in the downhole direction.

2. The bailer of claim 1, wherein the pump is configured to provide the filtered fluid in the uphole direction during collection of the debris by the bailer from the wellbore, and wherein the pump is configured to provide the wellbore fluid from the wellbore in the downhole direction during cleaning or dislodging of the bailer in the wellbore.

3. The bailer of claim 1, wherein the passive check valve comprises a Tesla valve.

4. The bailer of claim 1, wherein the passive check valve comprises a labyrinth valve.

5. The bailer of claim 1, wherein the passive check valve is configured to provide for an annular pressure drop through the annular path greater than a central pressure drop through the central path in response to the flow of the wellbore fluid in the downhole direction.

6. The bailer of claim 5, wherein the passive check valve is configured to provide for the annular pressure drop through the annular path less than the central pressure drop through the central path in response to the flow of the debris-laden fluid in the uphole direction and the flow of the filtered fluid in the uphole direction.

7. The bailer of claim 1, wherein the central path is at a radial center of the bailer and runs in an axial direction.

8. The bailer of claim 1, wherein a central tube of the bailer comprises the central path.

9. The bailer of claim 8, wherein the central tube is at a radial center of the bailer and runs in an axial direction.

10. A method of collecting debris from a wellbore, comprising:

deploying a bailer into the wellbore, the bailer comprising a passive check valve having a fixed geometry with no moving parts;

flowing debris-laden fluid from the wellbore in an uphole direction into a central path of the bailer via a pump of the bailer as operating in a debris-collecting mode of the bailer;

filtering debris from the debris-laden fluid in the debris-collecting mode giving a filtered fluid in the uphole direction in an annular path of the bailer, wherein the passive check valve provides for preferential fluid flow through the annular path over the central path in the debris-collecting mode;

holding the debris in a chamber of the bailer;

raising the bailer to a surface of Earth from the wellbore; and emptying the chamber of the debris at the surface.

11. The method of claim 10, wherein the debris-collecting mode comprises a suction mode of the bailer.

12. The method of claim 10, wherein the passive check valve comprises a Tesla valve.

13. The method of claim 10, wherein the passive check valve comprises a labyrinth valve.

14. The method of claim 10, comprising, in a reverse flow mode of the bailer, flowing fluid from the wellbore in a downhole direction through the bailer to clean the bailer or dislodge the bailer as stuck in the wellbore, or a combination thereof.

15. The method of claim 14, wherein the passive check valve provides for the preferential fluid flow through the central path over the annular path in the reverse flow mode.

16. The method of claim 14, wherein the passive check valve favors flow of the fluid through the central path over the annular path in the reverse flow mode.

17. The method of claim 14, wherein the passive check valve gives a greater pressure drop through the annular path than through the central path for flow of the fluid in the downhole direction in the reverse flow mode, wherein the fluid comprises wellbore fluid.

18. The method of claim 10, wherein the deploying the bailer comprises lowering the bailer from the surface into the wellbore.

* * * * *